United States Patent
Deng et al.

(10) Patent No.: US 7,206,741 B2
(45) Date of Patent: *Apr. 17, 2007

(54) METHOD OF SPEECH RECOGNITION USING TIME-DEPENDENT INTERPOLATION AND HIDDEN DYNAMIC VALUE CLASSES

(75) Inventors: Li Deng, Redmond, WA (US); Jian-lai Zhou, Beijing (CN); Frank Torsten Bernd Seide, Beijing (CN); Asela J. R. Gunawardana, Seattle, WA (US); Hagai Attias, Seattle, WA (US); Alejandro Acero, Bellevue, WA (US); Xuedong Huang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/294,858

(22) Filed: Dec. 6, 2005

(65) Prior Publication Data
US 2006/0085191 A1    Apr. 20, 2006

Related U.S. Application Data

(62) Division of application No. 10/267,522, filed on Oct. 9, 2002, now Pat. No. 7,050,975.

(60) Provisional application No. 60/405,971, filed on Aug. 26, 2002, provisional application No. 60/398,166, filed on Jul. 23, 2002.

(51) Int. Cl.
G10L 15/04    (2006.01)
(52) U.S. Cl. .................................... 704/254
(58) Field of Classification Search ......... 704/251–257
See application file for complete search history.

(56) References Cited

U.S. PATENT DOCUMENTS

| 4,980,917 | A |   | 12/1990 | Hutchins ................. 704/254 |
| 5,682,501 | A | * | 10/1997 | Sharman ................. 704/260 |
| 7,050,975 | B2 | * | 5/2006 | Deng et al. ............. 704/256.3 |

OTHER PUBLICATIONS

An Official Communication from European Application No. 03014848.0, filed Jun. 30, 2003.

Application and Proposed Amendment (Nov. 10, 2005) from U.S. Appl. No. 10/267,522, filed Oct. 9, 2002.

(Continued)

*Primary Examiner*—Abul K. Azad
(74) *Attorney, Agent, or Firm*—Theodore M. Magee; Westman, Champlin & Kelly, P.A.

(57) ABSTRACT

A speech signal is decoded by determining a production-related value for a current state based on an optimal production-related value at the end of a preceding state, the optimal production-related value being selected from a set of continuous values. The production-related value is used to determine a likelihood of a phone being represented by a set of observation vectors that are aligned with a path between the preceding state and the current state. The likelihood of the phone is combined with a score from the preceding state to determine a score for the current state, the score from the preceding state being associated with a discrete class of production-related values wherein the class matches the class of the optimal production-related value.

6 Claims, 6 Drawing Sheets

OTHER PUBLICATIONS

Feili, Chen et al., The Structure and Its Implementation of Hidden Dynamic HMM For Mandarin Speech Recognition, Proceedings ICLP 2002, Sep. 2002.

L. Deng, "A Dynamic, Feature-Based Approach to the Interface Between Phonology and Phonetics for Speech Modeling and Recognition," Speech Communication, vol. 24, No. 4, pp. 299-323 (1998).

L. Deng and Z. Ma, "Spontaneous Speech Recognition Using A Statistical Coarticulatory Model for the Hidden Vocal-Tract-Resonance Dynamics," J. Acoust. Soc. Am., vol. 108, No. 6, pp. 3036-3048 (2000).

L. Deng and J. Ma, "A Statistical Coarticulatory Model for the Hidden Vocal-Tract-Resonance Dynamics," Proc. of Eurospeech, vol. 4, pp. 1499-1502 (Sep. 1999).

L. Deng and H. Sameti, "Transitional Speech Units and Their Representation by the Regressive Markov States: Applications to Speech Recognition," IEEE Trans. Speech Audio Proc., vol. 4, No. 4, pp. 301-306 (Jul. 1996).

L. Deng and D. Sun, "A Statistical Approach to Automatic Speech Recognition Using the Atomic Speech Units Constructed from Overlapping Articulatory Features," J. Acoust. Soc. Am., vol. 95, pp. 2702-2719 (1994).

Y. Gao et al., "Multistage Coarticulation Model Combining Articulatory, Formant and Cepstral Features," Poc. ICSLP. vol. 1, pp. 25-28 (2000).

J. Ma and L. Deng, "A Path-Stack Algorithm for Optimizing Dynamic Regimes in a Statistical Hidden Dynamic Model of Speech," Computer Speech and Language, vol. 14, pp. 101-104 (2000).

M. Ostendorf et al., "From HMMs to Segment Models: A Unified View of Stochastic Modeling for Speech Recognition," IEEE Trans. Speech Audio Proc., vol. 4, pp. 360-378 (1996).

J. Ma and L. Deng, "Target-Directed Mixture Linear Dynamic Models for Spontaneous Speech Recognition," IEEE Trans. Speech and Audio Processing (submitted 1999, to appear 2002).

J. Bridle et al., "The WS98 Final Report on the Dynamic Model," http://www.clsp.jhu.edu/ws98/projects/dynamic/presentations/finalhtml/index.html, Johns Hopkins Univ. 1998).

F.-L. Chen et al., "The Structure and Its Implementation of Hidden Dynamic HMM for Mandarin Speech Recognition," Proc. ICSLP, pp. 713-716, Denver (2002).

European Search Report from European Application No. 03014848.0, filed Jun. 30, 2003.

G. Welch, G. Bishop, "An Introduction to the Kalman Filter," SIGGRAPH 2001 Conference, Aug. 12, 2001, pp. 1-47.

J. Bridle, L. Deng, J. Picone, H. Richards, J. Ma, T. Kamm, M. Schuster, S. Pike, R. Regan, "An Investigation of Segmental Hidden Dynamic Models of Speech Coarticulation for Automatic Speech Recognition," Report of the a Project at the 1998 Workshop on Language Engineering at the Center for Language and Speech Processing, The Johns Hopkins University, 1998, pp. 1-61.

Li Deng, "Articulatory Features and Associated Production Models in Statistical Speech Recognition," Computational Models of Speech Pattern Processing, NATO ASI Series, 1999, pp. 214-224.

Asai, K. et al., "Dividing the Distributions of HMM and Linear Interpolation in Speech Recognition; Acoustics, Speech and Signal Process," 1992, ICASSP-92, IEEE Inter Conference on vol. 1, 23-26, Mar. 1992, pp. 29-32.

* cited by examiner

METHOD OF SPEECH RECOGNITION USING TIME-DEPENDENT INTERPOLATION AND HIDDEN DYNAMIC VALUE CLASSES

REFERENCE TO RELATED APPLICATIONS

This application is a Divisional of and claims priority from U.S. patent application Ser. No. 10/267,522 filed on Oct. 9, 2002 now U.S. Pat No. 7,050,975, which claims priority benefit of U.S. Provisional Application Ser. No. 60/398,166, filed on Jul. 23, 2002 and U.S. Provisional Application Ser. No. 60/405,971, filed on Aug. 26, 2002.

BACKGROUND OF THE INVENTION

The present invention relates to pattern recognition. In particular, the present invention relates to speech recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

Many speech recognition systems utilize Hidden Markov Models in which phonetic units are represented by a single tier of connected states. Using a training signal, probability distributions for occupying the states and for transitioning between states are determined for each of the phonetic units. To decode a speech signal, the signal is divided into frames and each frame is transformed into a feature vector. The feature vectors are then compared to the distributions for the states to identify a most likely sequence of HMM states that can be represented by the frames. The phonetic unit that corresponds to that sequence is then selected.

Although HMM-based recognition systems perform well in many relatively simple speech recognition tasks, they do not model some important dynamic aspects of speech directly (and are known to perform poorly for difficult tasks such as conversational speech). As a result, they are not able to accommodate dynamic articulation differences between the speech signals used for training and the speech signal being decoded. For example, in casual speaking settings, speakers tend to hypo-articulate, or under articulate their speech. This means that the trajectory of the user's speech articulation may not reach its intended target before it is redirected to a next target. Because the training signals are typically formed using a "reading" style of speech in which the speaker provides more fully articulated speech material than in hypo-articulated speech, the hypo-articulated speech does not match the trained HMM states. As a result, the recognizer provides less than ideal recognition results for casual speech.

A similar problem occurs with hyper-articulated speech. In hyper-articulated speech, the speaker exerts an extra effort to make the different sounds of their speech distinguishable. This extra effort can include changing the sounds of certain phonetic units so that they are more distinguishable from similar sounding phonetic units, holding the sounds of certain phonetic units longer, or transitioning between sounds more abruptly so that each sound is perceived as being distinct from its neighbors. Each of these mechanisms makes it more difficult to recognize the speech using an HMM system because each technique results in a set of feature vectors for the speech signal that do not match well to the feature vectors present in the training data.

HMM systems also have trouble dealing with changes in the rate at which people speak. Thus, if someone speaks slower or faster than the training signal, the HMM system will tend to make more errors decoding the speech signal.

Alternatives to HMM systems have been proposed. In particular, it has been proposed that the trajectory or behavior of a production-related parameter of the speech signal should be modeled directly. However, none of the proposals have completely modeled the dynamic aspects of speech. In particular, the models have not addressed the time-dependent change in the trajectory that occurs as the speaker approaches a desired target for a phonetic unit. In addition, the models have not provided a decoding means that allows for a probability determination based on continuous values for the trajectory while limiting the search space to a manageable number of trajectory states.

In light of this, a speech recognition framework is needed that explicitly models the production-related behavior of speech in terms of other model variables such that the dynamic aspects of speech trajectory are better modeled and decoding is manageable.

SUMMARY OF THE INVENTION

A speech signal is decoded by determining a production-related value for a current state based on an optimal production-related value at the end of a preceding state, the optimal production-related value being selected from a set of continuous values. The production-related value is used to determine a likelihood of a phone being represented by a set of observation vectors that are aligned with a path between the preceding state and the current state. The likelihood of the phone is combined with a score from the preceding state to determine a score for the current state, the score from the preceding state being associated with a discrete class of production-related values wherein the class matches the class of the optimal production-related value.

DETAILED DESCRIPTION OF ILLUSTRATIVE EMBODIMENTS

Figure 1:
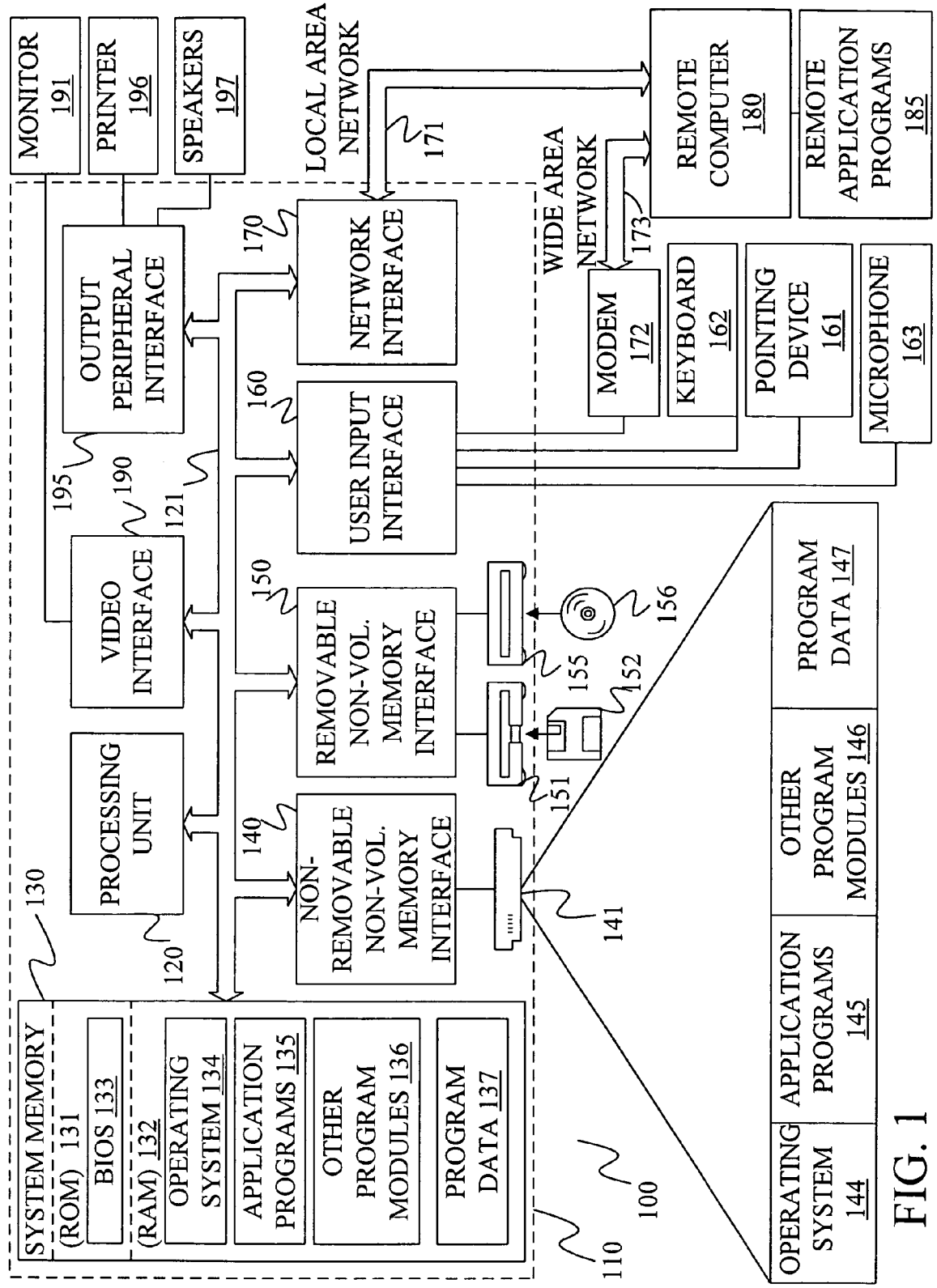
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
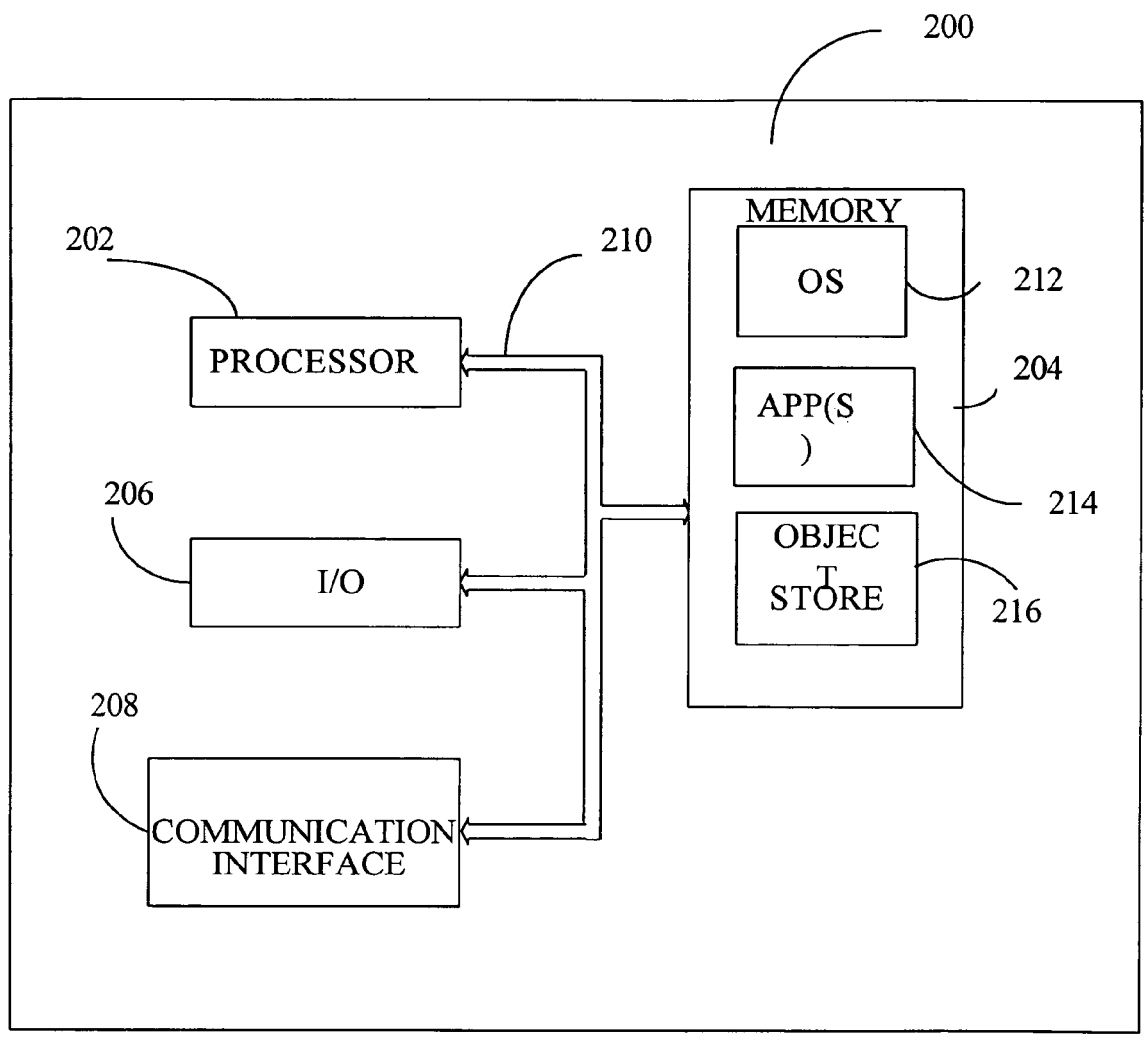
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention provides a generative model of speech. Under this model, speech is represented as an attempt by the speaker to phonetically implement a linguistic definition of a sequence of phonological units. During this attempt, the speaker produces a production-related value that follows a trajectory from a value associated with the end of a previous phonological unit toward a target associated with a current phonological unit. This trajectory is modeled as an interpolation between the value at the end of the previous phonological unit and the target value wherein the interpolation includes a time-dependent weight such that the weighting between the two interpolation points changes over the length of the phonological unit.

The model of the present invention is referred to as a Hidden Trajectory Model, which is a special form of a Hidden-Dynamic Model in that the dynamics is specified by an explicit form of time dependency rather by a recursive form. This hidden trajectory model includes two layers, a dynamic or trajectory model component that describes hidden production-related parameters (such as vocal track resonance), and a mapping model component that translates the production-related parameters into observable acoustic features such as Mel-Frequency Cepstral Coefficients. The dynamic model predicts a sequence of trajectory values $(z(1), \ldots, z(t), \ldots, z(T))$ for a production-related parameter given a phone sequence $(u_1, \ldots, u_j, \ldots, u_N)$ with corresponding boundaries $(\tau_1 \ldots \tau_{N+1})$. The mapping model predicts a sequence of acoustic observation vectors given the sequence of trajectory values, the phone sequence and the phone boundaries.

For both layers, a statistical model is provided:

$$z(t)=g(t)+w(t) \qquad \text{Eq. 1}$$

$$o(t)=h^{u_j}(z(t))+v(t) \qquad \text{Eq. 2}$$

with g(t) being the expected trajectory, and $h^{u_j}$ being a phone-dependent mapping function to map the production-related parameters to feature space.

The summands w(t) and v(t) denote i.i.d. Gaussian noise with zero mean and covariance matrices $Q=C_{ww}$ and $R=C_{vv}$, respectively, that model the deviation of the actual observation from the expected values. I.e.:

$$p(z(t)|g(t)) = N(z(t); g(t), Q) \qquad \text{Eq. 3}$$

$$p(o(t)|z(t), u) = N(o(t); h^{u_j}(z(t)), R) \qquad \text{Eq. 4}$$

Under the invention, a separate set of trajectory parameters are trained for each phone in the language. In addition, the trajectory within a phone is determined based on the value of the trajectory at the beginning of the phone and the amount of time that has passed since the beginning of the phone. Thus, the trajectory within a phone $u_j$ can be described relative to a local time $k=t-\tau_j$ where $\tau_j$ is the time at which phone $u_j$ begins and where each phone has a duration $K^j = \tau_{j+1} - \tau_j$.

Under the invention, the trajectory at any local time index k for a phone $u_j$ is defined as:

$$g_k^j = \beta^{u_j}(k) \cdot g_0^j + (1 - \beta^{u_j}(k)) \cdot T^{u_j} \quad \text{Eq. 5}$$

$$\beta^{u_j}(k) = (1 + \gamma^{u_j} k) \cdot e^{-\gamma^{u_j} k} \quad \text{Eq. 6}$$

where $T^{u_j}$ is the target for the trajectory of phone $u_j$, $\gamma^{u_j}$ is a time constant associated with phone $u_j$, and $g_0^j$ is the initial value of the trajectory on entry into the phone. Note that the parenthetical term on the right-hand side of equation 6 is a critical damping function. Also note that the present invention provides for continuity between phones by insuring that $$g_0^j = g_{K^{j-1}}^{j-1} \quad \text{Eq. 7}$$

where $g_0^j$ is the value of the trajectory at the beginning of phone $u_j$ and $g_{K^{j-1}}^{j-1}$ is the value of the trajectory at the end of phone $u_{j-1}$.

Equations 5 and 7 have two important properties. First, at time $k=0$, the trajectory is equal to the ending value of the trajectory for the preceding phone. Second, if a phone lasts for a long period of time, the trajectory reaches the target $T^{u_j}$. Thus, the trajectory computed in Equation 5 is a linear interpolation between the production-related dynamics value at the beginning of the phone $g_0^j$ and a production-related target $T^{u_j}$, with a time-dependent interpolation weight $\beta^{u_j}(k)$.

Under the present invention, the phone-dependent mapping function $h^{u_j}$ used to map the production-related trajectory onto acoustic features is a piece-wise linear function defined as:

$$h^{u_j}(z(t)) = H_m z(t) + h_m \quad \text{EQ. 8}$$

where m is a mixture index that is constant for a frame or for an entire phone. In one embodiment, $H_m$ and $h_m$ are not phone dependent. In another embodiment, they are made dependent on phones, phone classes, or sub-phone units corresponding to HMM states arranged in the left-to-right manner.

Under one aspect of the present invention, the predicted vectors for silence and noise phones are formed by assuming that $H_m = 0$. As a result, the predicted feature vectors for silence and noise are not dependent on the trajectory of the production-related value. This is consistent with the generative model where silence and noise represent an interruption in speech generation.

Using this mapping function, equations 2 and 4 become:

$$o(t) = H_m z(t) + h_m + v(t) \quad \text{Eq. 9}$$

$$p(o(t)|z(t),u) = N(o(t); H_m z(t) + h_m, R_m) \quad \text{Eq. 10}$$

The model parameters $T^{u_j}$, $\gamma^{u_j}$, $H_m$, $h_m$, Q, $R_m$, are trained using an Expectation-Maximization training algorithm. The algorithm includes an E-step in which a set of training observation vectors are used with an initial estimate of the model parameters to develop sufficient statistics to predict the value of the certain hidden variables including mixture weights, the trajectory, and the square of the trajectory. In particular, the E step involves the following calculations:

$$\omega_m^n = P(m|o^n) = \frac{p(o^n|m)P(m)}{\sum_{m'=1}^{M} p(o^n|m')P(m')} \quad \text{EQ. 11}$$

$$p(o^n|m) = \prod_{k=1}^{K^n} p(o_k^n|m) = \prod_{k=1}^{K^n} N(o_k^n; H_m g_k^n + h_m, S_m) \quad \text{EQ. 12}$$

$$E[z_k^n|o^n, m] = \quad \text{EQ. 13}$$
$$[H_m^{TRANS} R_m^{-1} H_m + Q^{-1}]^{-1} [H_m^{TRANS} R_m^{-1} (o_k^n - h_m) + Q^{-1} g_k^n]$$

$$E[z_k^n z_k^{n\,trans} | o^n, m] = E[z_k^n z_k^{n\,trans} | o_k^n, m] = \quad \text{EQ. 14}$$
$$[H_m^{TRANS} R_m^{-1} H_m + Q^{-1}]^{-1} + E[z_k^n | o^n, m] E[z_k^n | o^n, m]^{Trans}$$

where:

$$S_m = H_m Q H_m^{trans} + R_m \quad \text{EQ. 15}$$

$\omega_m^n$ is a mixture weight for token n as defined by the phone boundaries, $o_k^n$ is the kth observed training vector for token n, $g_k^n$ is the value of the expected trajectory in token n at local time point k, $z_k^n$ is the value of the actual trajectory in token n at local time point k, m is a mixture component used with token n, M is the number of mixture components associated with token n, the probability of each mixture component $P(m)$ is uniform and equal to $1/M$, "trans" represents the transpose of a matrix, and $E[x|y]$ represents the expected value of x given y.

The above completes the E-step in the EM algorithm. To perform the first iteration of the M-step, initial estimates of the model parameters must be provided. Under one embodiment, initial estimates for $T^{u_j}$ and $\gamma^{u_j}$ are selected using combined knowledge of the Klatt speech synthesizer and some spectrogram analysis results. Alignment boundaries $(\tau_1 \ldots \tau_{N+1})$ are then determined for the set of training observation vectors using an existing HMM system and techniques for alignment that are well known. Using the targets $T^{u_j}$, the time constants $\gamma^{u_j}$, and alignment boundaries $(\tau_1 \ldots \tau_{N+1})$, a set of trajectories $g(t)$ is estimated using equation 5 above. Initially assuming that the noise $w(t)$ in the determination of each trajectory is zero and randomly assigning observation vectors to mixtures, $H_m$ and $h_m$ are estimated to minimize the sum of the squared error between the observed feature vectors $o(t)$ and the calculated feature vectors, where the error is computed as:

$$v(t) = o(t) - (H_m g(t) + h_m) \quad \text{Eq. 16}$$

Once $g(t)$, $H_m$ and $h_m$ have been determined for each mixture, the covariance matrix $R_m$ can be estimated for each mixture as:

$$R_m = E\{vv^{trans}\} \quad \text{Eq. 17}$$
$$= \frac{1}{T} \sum_t v(t) \cdot v(t)^{trans}$$
$$= \frac{1}{T} \sum_t (o(t) - (H_m g(t) + h_m)) \cdot (o(t) - (H_m g(t) + h_m))^{trans}$$

The estimate of Q is determined by first estimating the noise w(t) in the determination of the trajectory g(t) such that the observation noise v(t) is minimized. This results in:

$$w(t) = (H_m^{trans} H_m)^{-1} H_m^{trans} \cdot (o(t) - (H_m g(t) + h_m)) \qquad \text{Eq. 18}$$

Q is then initialized as:

$$Q = E\{ww^{trans}\} \qquad \text{Eq. 19}$$
$$= \frac{1}{T} \sum_t w(t) \cdot w(t)^{trans}$$

Under one embodiment, $R_m$ and Q are assumed to be diagonal matrices so only the diagonals of the matrices are calculated.

After the initial model parameters have been obtained as described above, they are used, together with the results from the E-step to re-estimate estimate the model parameters in the M-step. Specifically, the model parameters are calculated as:

$$\hat{h}_m = \frac{\sum_{n=1}^{N} \left[ \omega_m^n \sum_{k=1}^{K^n} (o_k^n - \hat{H}_m E[z_k^n \mid o^n, m]) \right]}{\sum_{n=1}^{N} K^n \omega_m^n} \qquad \text{EQ. 28}$$

$$\hat{R}_m = \frac{\sum_{n=1}^{N} \left[ \omega_m^n \sum_{k=1}^{K^n} (o_k^n - \hat{H}_m E[z_k^n \mid o^n, m] - \hat{h}_m)(o_k^n - \hat{H}_m E[z_k^n \mid o^n, m] - \hat{h}_m)^{trans} \right]}{\sum_{n=1}^{N} K^n \omega_m^n} \qquad \text{EQ. 29}$$

$$\hat{Q} = \frac{\sum_{n=1}^{N} \left[ \sum_{k=1}^{K^n} (E[z_k^n \mid o^n] - g_k^n)(E[z_k^n \mid o^n] - g_k^n)^{trans} \right]}{\sum_{n=1}^{N} K^n} \qquad \text{EQ. 30}$$

$$\hat{T} = \frac{\sum_{n=1}^{N} \sum_{k=1}^{K^n} \sum_{m=1}^{M^n} \omega_m^n (E[z_k^n \mid o^n, m] - g_0^n(k))}{\sum_{n=1}^{N} K^n \cdot \sum_{m=1}^{M} \omega_m^n} \qquad \text{EQ. 20}$$

where $\hat{T}$ is the update for T, $g_0^n(k) = (g_{K^{j-1}} - T)(1 + \gamma k) \exp(-\gamma k)$, and T is the previously estimated target;

$$\hat{H}_m = (A - CB) \cdot (I - DB)^{-1} \qquad \text{EQ. 21}$$

where $$A = \left\{ \sum_{n=1}^{N} \omega_m^n \sum_{k=1}^{K^n} (o_k^n \cdot E\{z_k^n\}^{trans}) \right\} \cdot X \qquad \text{EQ. 22}$$

-continued $$B = \left\{ \sum_{n=1}^{N} \omega_m^n \sum_{k=1}^{K^n} E\{z_k^n\}^{trans} \right\} \cdot X \qquad \text{EQ. 23}$$

$$C = \left\{ \sum_{n=1}^{N} \omega_m^n \sum_{k=1}^{K^n} (o_k^n) \right\} \cdot Y \qquad \text{EQ. 24}$$

$$D = \left\{ \sum_{n=1}^{N} \omega_m^n \sum_{k=1}^{K^n} E\{z_k^n\} \right\} \cdot Y \qquad \text{EQ. 25}$$

$$X = \left\{ \sum_{n=1}^{N} \omega_m^n \sum_{k=1}^{K^n} E\{z_k^n z_k^{n\,trans}\} \right\}^{-1} \qquad \text{EQ. 26}$$

$$Y = \frac{1}{\sum_{n=1}^{N} K^n \omega_m^n} \qquad \text{EQ. 27}$$

and I is the identity matrix;

and $\hat{\gamma}$ is determined using a gradient descent algorithm where $\hat{\gamma}$ is progressively updated until it changes less than a threshold amount between iterations. Specifically, $\hat{\gamma}$ is updated using:

$$\hat{\gamma}^{r+1} = \hat{\gamma}^r + \varepsilon(-2)Q^{-1} \sum_{n=1}^{N} \sum_{k=1}^{K^n} (z_k^n - g^n) \cdot (\hat{\gamma}^r \cdot k^2 \cdot (g_0^n - \hat{T}) \cdot e^{-\hat{\gamma}k}) \qquad \text{EQ. 31}$$

The E-step and the M-step may be iterated a number of times to come to a final set of model parameters. Once the final set of parameters has been determined, they can be used to decode an observed set of acoustic vectors.

The decoding task involves finding a phone sequence that most likely generated a sequence of acoustic observations. Under one embodiment of the present invention, decoding is performed using a Finite-State Transducer in which each phone is represented by an edge connecting two states where the states' positions in time are determined during decoding.

Thus the decoding process involves finding the sequence of edges $(E=(e_1, \ldots, e_j, \ldots, e_n))$ and state positions that most likely generated the sequence of acoustic observations $(O=(o_1, \ldots, o_l, \ldots, o_L))$:

$$\hat{E} = \underset{E}{\mathrm{argmax}} P(E \mid O) \qquad \text{EQ. 32}$$

which using Bayes rule and ignoring the denominator becomes:

$$\hat{E} = \underset{E}{\mathrm{argmax}} P(O \mid E) P(E) \qquad \text{EQ. 33}$$

The probabilities of equation 33 are determined as follows:

$$\underset{E}{\mathrm{argmax}} P(O \mid E) P(E) = \max_{n \in \{n_{term}\}} \max_g \{H_{c(g)}(L, n)\} \qquad \text{EQ. 34}$$

where:

$n_{term}$ is the set of all terminal states;

L is the time index of the last observation; and $H_{c(g)}(L,n)$ is the highest scoring path into node n at time L that has a trajectory g in a class of trajectories c(g), where the highest scoring path is determined as:

$$H_{c(g)}(t, n) = \max_{e:n_{e2}} \max_{\Delta t} \{Q_{c(g),\Delta t}(t, e)\} \qquad \text{EQ. 35}$$

where:

$e:n_{e2}=n$ is the set of edges that end at state n;

$\Delta t$ is equal to t−t' where t' is the time index at which the current phone or edge began and t is the time index for state n, thus $\Delta t$ is a possible duration for the current phone; and $$Q_{c(g),\Delta t}(t, e) = \max_{g'} \{\delta(c(g) = c(G_{g'}(\Delta t, e))) \cdot R_{c(g'),\Delta t}(t, e)\} \qquad \text{EQ. 36}$$

where:

$Q_{c(g),\Delta t}(t,e)$ can be understood as the probability of the best path entering node n along a trajectory of class c(g) at time t along edge e, that entered the edge at time t'=t−$\Delta t$;

g' is the trajectory history up to the end of the previous edge;

c(·) indicates a discrete class of a trajectory where the continuous values of the possible trajectories have been clustered;

$$\delta(A = B) = \begin{cases} 1 & \text{for } A = B \\ 0 & \text{otherwise} \end{cases} \qquad \text{EQ. 37}$$

$$G_{g'}(\Delta t, e) = \beta(\Delta t) \cdot g' + (1 - \beta(\Delta t)) \cdot T \qquad \text{EQ. 38}$$

and

-continued $$R_{c(g'),\Delta t}(t, e) = \qquad \text{EQ. 39}$$
$$\left\{ p(o(t) \mid \Delta t, e, g'_{opt}) \frac{P(\Delta t \mid e)}{P(\Delta t - 1 \mid e)} \cdot R_{c(g'),\Delta t-1}(t-1, e) \right\}$$

with $$R_{c(g'),0}(t, e) = P(\Delta t = 0 \mid e) \cdot P(e) \cdot H_{c(g')}(t, n_{e1}) \qquad \text{EQ. 40}$$

$$p(o(t) \mid \Delta t, e, g'_{opt}) = \sum_m P(m \mid u, g) \cdot N(o(t); H_m g^e_{\Delta t} + h_m; S_m) \qquad \text{EQ. 41}$$

which is a likelihood for the hypothesis phone associated with edge e and the hypothesis duration and is approximated as:

$$p(o(t) \mid \Delta t, e, g'_{opt}) \approx C \max_m \{N(o(t); H_m g^e_{\Delta t} + h_m; S_m)\} \qquad \text{EQ. 42}$$

where $S_m$ is defined in equation 15 above;

$g'_{opt}$ is the g' that maximizes the right-hand side of equation 36 when used to calculate $g_{\Delta t}^e$, and represents the starting production-related value for the current phone;

$g_{\Delta t}^e$ is the expected value of the production-related dynamics value given $\Delta t$, $g'_{opt}$, and the trajectory parameters associated with edge e;

C is a constant;

$H_m g_{\Delta t}^e + h_m$ represents a predicted value for the observation vector, where $H_m$ and $h_m$ are not dependent on the phone associated with edge e; and the calculation on the right-hand side of equation 42 involves taking the difference between the observation vector and $H_m g_{\Delta t}^e + h_m$.

Equation 39 is performed recursively within an edge, e, which represents a single phone, for each time index from the first time index assigned to the edge (t'=t−$\Delta t$) to the current time index t. As shown by Equation 40, when the first time index is reached, a further recursion is performed by evaluating equation 35 using the state at the beginning of the current edge and the time index of the beginning of the current edge. This recursion is indicated by the last term in Equation 40.

The duration models in Equation 39, (P($\Delta t$|e) and P($\Delta t$−1|e), can be trained using a prior art HMM model to segment a training observation sequence. Using the segmented text, durations for each phone are identified and used to construct a duration probability distribution for each phone.

Figure 4:
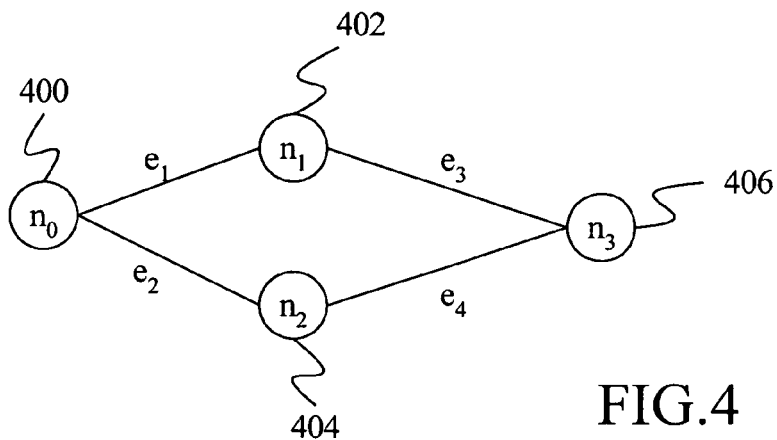
FIG. 4 is a simple finite state diagram.
Figure 5:
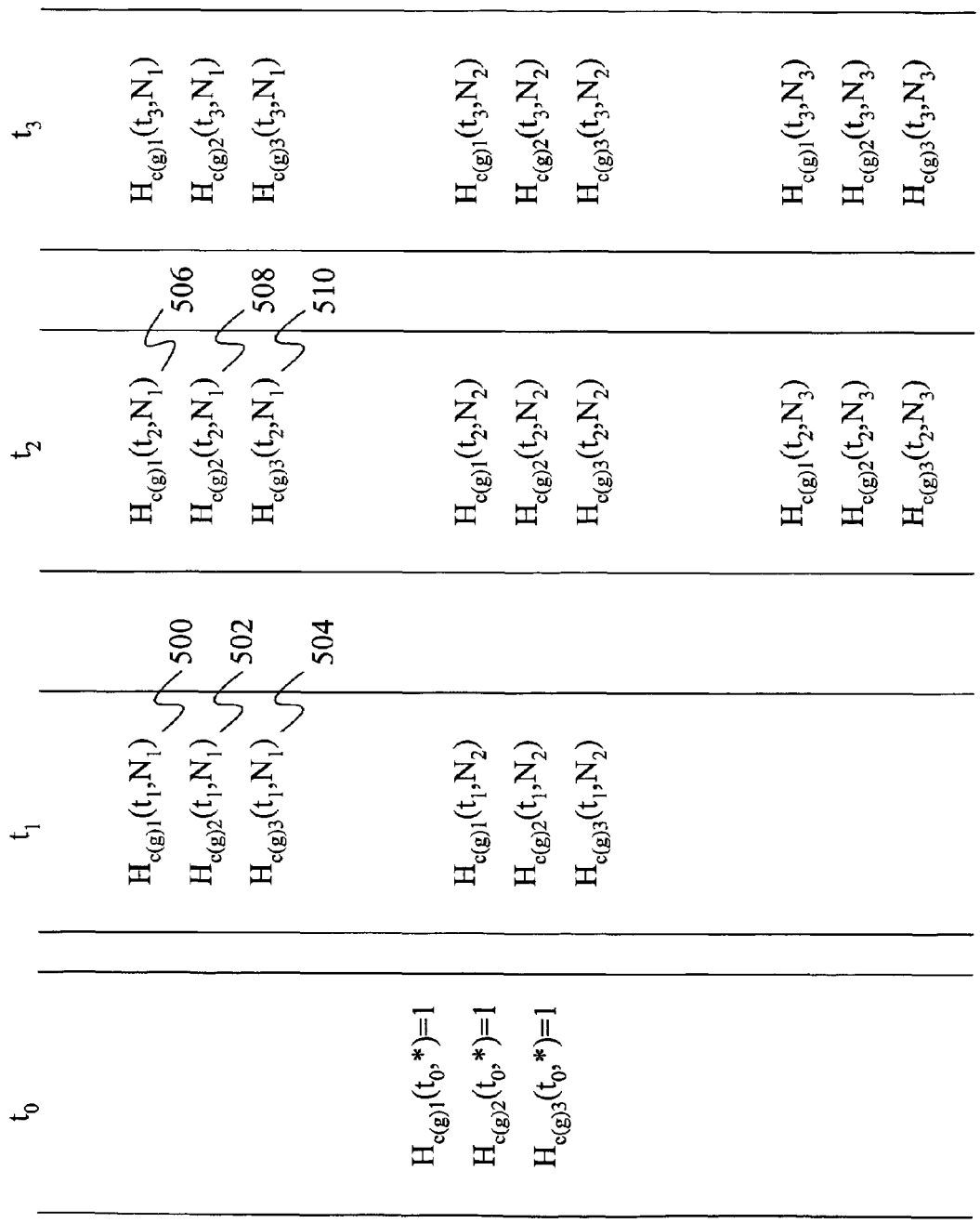
FIG. 5 is a state diagram showing class path scores at various states and times.
Figure 6:
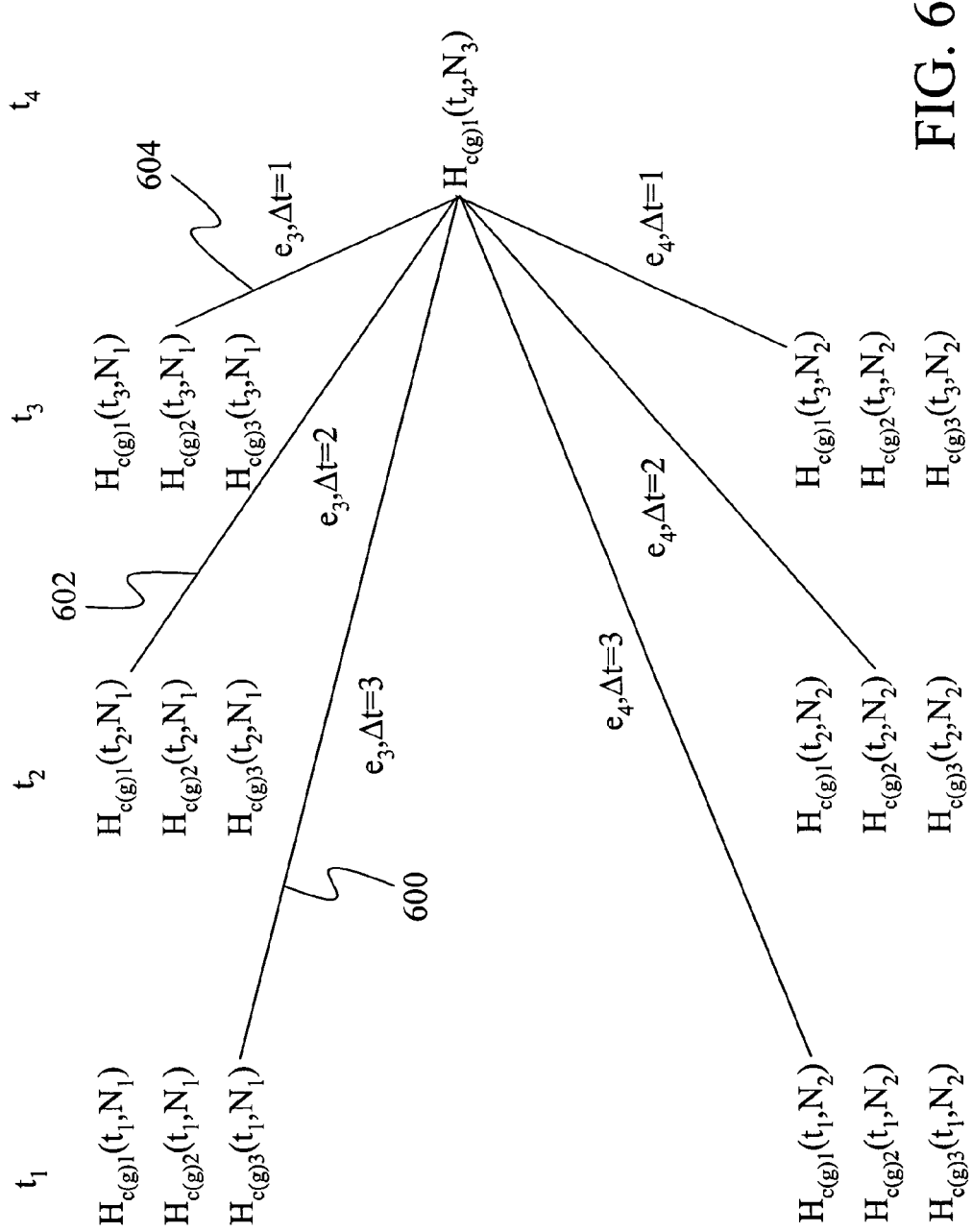
FIG. 6 is a state diagram showing the path connections used to calculate a class path score for a state at a new time index.

Although shown in a recursive framework above, the decoding of Equations 32–42 is performed in an iterative fashion under one embodiment of the present invention as described below with reference to the flow diagram of FIG. 3. In the method shown in FIG. 3, a set of best path scores is determined at each frame of the observed signal. In particular, for each state that is available at a particular frame, a separate $H_{c(g)}(t,n)$ value as found in Equation 35 above is determined for each class of trajectory. For example, for the simple state diagram of FIG. 4 that contains four states 400, 402, 404, and 406, the $H_{c(g)}(t,n)$ values of FIG. 5 would be generated, provided that there are only three classes of trajectories. Thus, values 500, 502, and 504 would be generated during the first frame (time index $t_1$) for classes c(g)1, c(g)2, and c(g)3, respectively, in state $n_1$. Values 506, 508 and 510 would be generated during the second frame (time index $t_2$) for classes c(g)1, c(g)2, and c(g)3, respectively, in state $n_1$. FIG. 6 shows the diagram of FIG. 5 during the calculation of scores for the fourth frame of the observed vectors. FIG. 6 is referred to in the description of FIG. 3 below.

Figure 3:
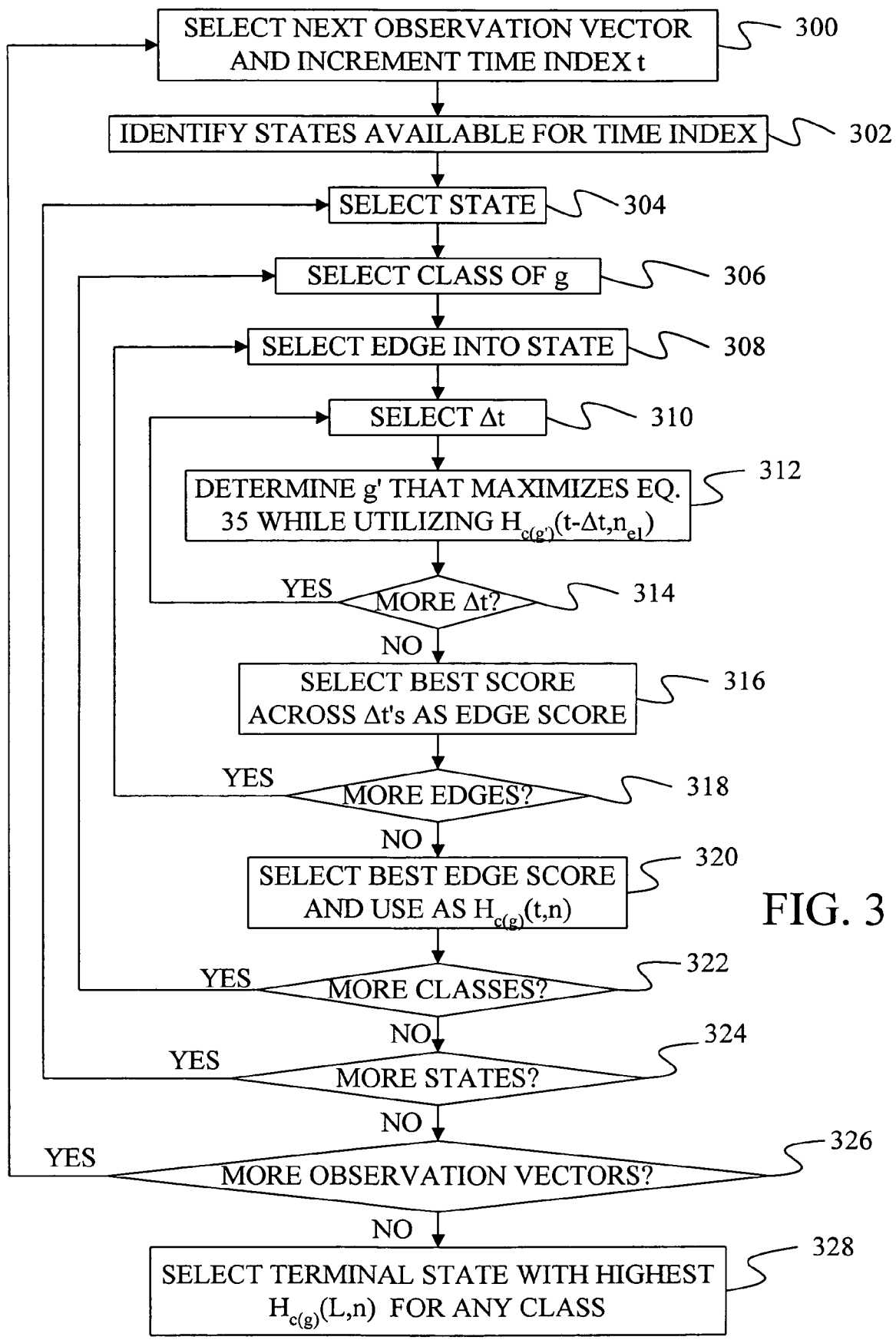
FIG. 3 is a flow diagram of a method of decoding under one embodiment of the present invention.

In step 300 of FIG. 3, the first observed vector is selected and the time index is set to 1. At step 302, states that are available during the time index are identified. A state is available for a time index if the time index is equal to the number of edges between the state and beginning state $n_0$ of the finite state system. For example, in the simplified state system of FIG. 4, there are four states: 400, 402, 404 and 406. During time index 1, only states 402 and 404 are available because there have not been enough observed feature vectors to have at least one feature vector for each edge between state 400 and state 404. During time index 2, states 402, 404, and 406 would all be available.

In other embodiments, states are not considered available if the time index is some amount greater than the number of edges between the state and beginning state $n_0$. This reduces the number of computations that are performed by eliminating temporal positions for states that are unlikely to occur.

After the available states have been identified, one of those states is selected at step 304. A class of trajectories, c(g), is then selected at step 306. Thus, in FIG. 6, steps 304 and 306 result in the selection of state $n_2$ and class c(g)1. This is the state and class for which a $H_{c(g)}(t,n)$ value will be generated.

At step 308, an edge into the selected state is selected. For example, edge $e_3$ of FIG. 4 would be selected for state 406. After an edge has been selected, a Δt is selected at step 310. These selections identify a previous state at a particular time index. Thus, for example, selecting edge $e_3$ and Δt=3 in steps 308 and 310 would result in selecting the occurrence of state n1 at time index t1 as the previous state in FIG. 6.

At step 312, a g' is identified that maximizes the calculation shown in equation 36 for the currently selected class of trajectories, the selected edge and the selected Δt. As shown by equations 39 and 40, the computation of equation 36 is performed recursively along all of the time indices crossed by Δt and is dependent on the value of $H_{c(g')}(t-\Delta t, n_{ei})$ associated with the state at the beginning of the selected edge. Note that the value $H_{c(g')}(t-\Delta t, n_{ei})$ has been previously calculated using the method of FIG. 3 at an earlier time index and that the value is selected based on the class of the g' that is optimal for equation 36. Thus, if g' is in class c(g)3, then $H_{c(g)3}(t_1, n_1)$ would be used in the calculation of equations 39 and 40 for state $N_3$ at time $t_4$ using edge e3 and Δt=3 as shown by line 600 of FIG. 6.

At step 314, the method determines if there are additional Δt to be considered. If there are, the process returns to step 310 to select a different Δt. Step 312 is then repeated using the new Δt to identify a new score using equation 36.

When there are no more Δt, the scores calculated using equation 36 are compared to each other and the highest score is selected as the score for the current edge at step 316. For example, a separate score would be calculated for each of Δt=1, Δt=2, and Δt=3, for edge $e_3$ as represented by lines 600, 602, and 604 of FIG. 6. The highest score would then be selected at step 316, thereby selecting a particular alignment between the states and the observed speech frames.

At step 318, the method determines if there are any more edges that end at the current state. If there are, the process returns to step 308 and steps 310, 312, 314, and 316 are repeated to generate an edge score for the newly selected edge. For example, in FIG. 6, an edge score would be generated for edge $e_4$.

When there are no more edges that end at the current state at step 318, the highest edge score is selected as the $H_{c(g)}(t,n)$ path score for the selected class and state.

At step 322, the process determines if there are additional classes that need a $H_{c(g)}(t,n)$ path score. If there are, the process returns to step 306 to select the next class of trajectories. Steps 308–320 are then repeated to generate a $H_{c(g)}(t,n)$ path score for the newly selected class. When there are no more classes at step 322, the process determines if there are any more available states that need to be scored at step 324. If there are, the process returns to step 304 to select the next available state and steps 306–322 are repeated to generate a collection of $H_{c(g)}(t,n)$ path scores for the state.

When scores have been generated for all of the available states at the current time index, the process determines if there is another observation vector at step 326. If there is, the process returns to step 300 where the next observation vector is selected and the time index is incremented by one. Steps 302–324 are then repeated for the new vector and time index. When the last observation vector has been processed at step 326, the terminal state with the highest score, regardless of class, is selected as the final state in the decoded path. The decoded path is then determined by tracing back along the edge and Δt that were used to generate the highest $H_{c(g)}(t,n)$ score at each state.

Note that the use of classes of trajectories under the present invention makes it possible to perform the decoding in this manner. Without such classes, a finite state transducer could not be used because there would be an infinite number of states. The reason for this is that the trajectories (g) are continuous and as such can take on any value. By generating a score for a class of trajectories instead of the trajectories, makes it possible to have a finite number of states and thus allows for the decoding described in FIG. 3. Also note that although the class is used to limit the number of scores that are calculated for each state, the optimal trajectory, g', is selected from the set of continuous values for g' and is used to generate the scores. (see Equation 41 above). This allows for accuracy in the determination of the score while still allowing the finite state decoding described above.

Figure 7:
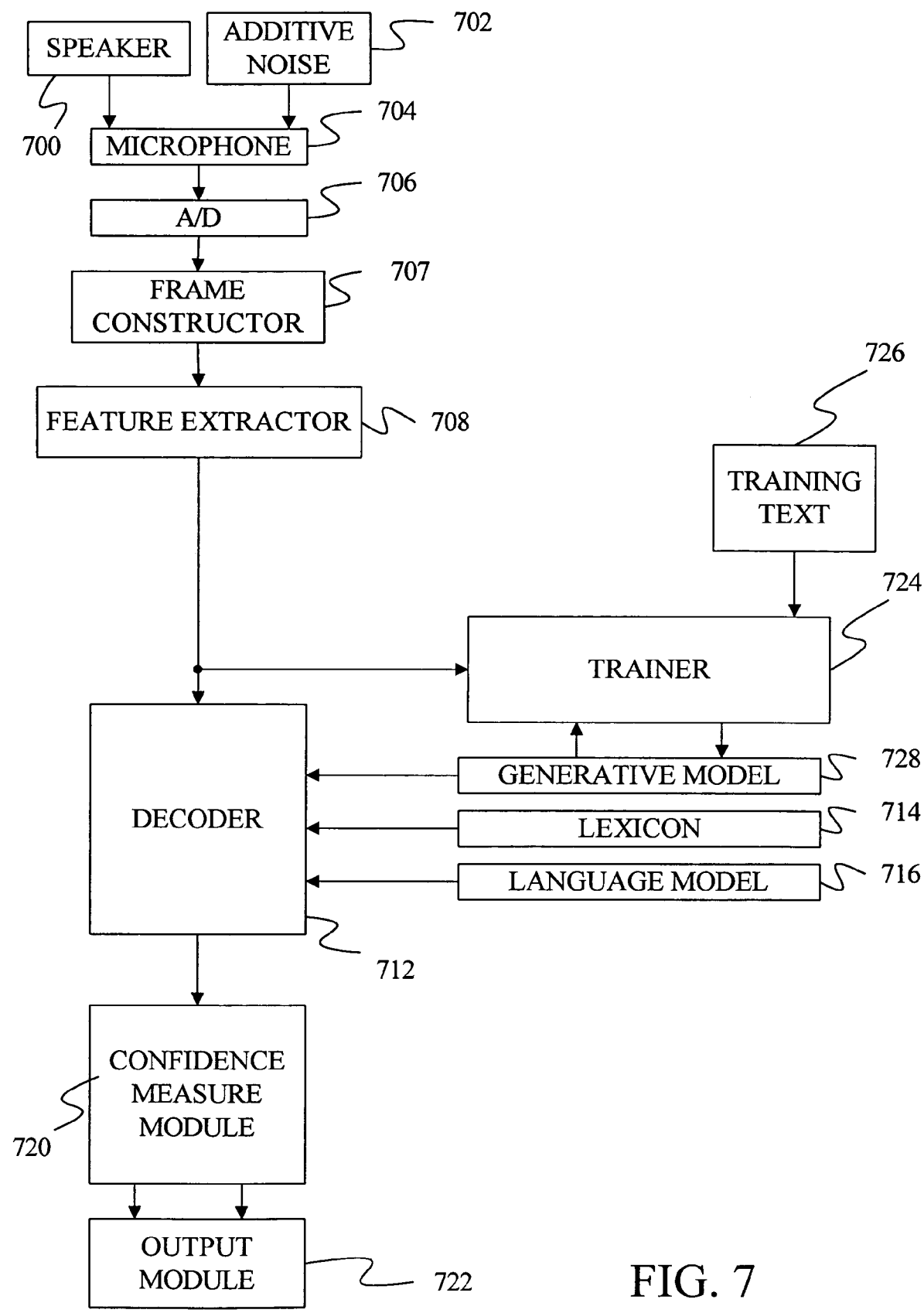
FIG. 7 is a block diagram of a speech recognition system under one embodiment of the present invention.

FIG. 7 provides a block diagram of a speech recognition system in which the present invention can be used. In FIG. 7, a speaker 700, either a trainer or a user, speaks into a microphone 704. Microphone 704 also receives additive noise from one or more noise sources 702. The audio signals detected by microphone 704 are converted into electrical signals that are provided to analog-to-digital converter 706.

A-to-D converter 706 converts the analog signal from microphone 704 into a series of digital values. In several embodiments, A-to-D converter 706 samples the analog signal at 16 kHz and 16 bits per sample, thereby creating 32 kilobytes of speech data per second. These digital values are provided to a frame constructor 707, which, in one embodiment, groups the values into 25 millisecond frames that start 10 milliseconds apart.

The frames of data created by frame constructor 707 are provided to feature extractor 708, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction.

Note that the invention is not limited to these feature extraction modules and that other modules may be used within the context of the present invention.

If the input signal is a training signal, this series of feature vectors is provided to a trainer 724, which uses the feature vectors and a training text 726 to train the generative model 728 of the present invention. For example, the EM training algorithm described above may be used to train the generative model.

If the input signal is a test signal, the feature vectors are provided to a decoder 712, which identifies a most likely sequence of words based on the stream of feature vectors, a lexicon 714, a language model 716, and the generative model 728. Under one embodiment, lexicon 714 defines the finite state network that is traversed by decoder 712 to identify a word from a sequence of feature vectors.

The most probable sequence of hypothesis words is provided to a confidence measure module 720. Confidence measure module 720 identifies which words are most likely to have been improperly identified by the speech recognizer, based in part on a secondary acoustic model(not shown). Confidence measure module 720 then provides the sequence of hypothesis words to an output module 722 along with identifiers indicating which words may have been improperly identified. Those skilled in the art will recognize that confidence measure module 720 is not necessary for the practice of the present invention.

Although the present invention has been described with reference to particular embodiments, workers skilled in the art will recognize that changes may be made in form and detail without departing from the spirit and scope of the invention.

What is claimed is:

1. A method of decoding a speech signal by generating a score for a current state in a finite state system, the method comprising:
   determining a production-related value for the current state based on an optimal production-related value at the end of a preceding state, the optimal production-related value being selected from a set of continuous values,
   using the production-related value to determine a likelihood of a phone being represented by a set of observation vectors that are aligned with a path between the preceding state and the current state; and
   combining the likelihood of the phone with a score from the preceding state to determine the score for the current state, the score from the preceding state being associated with a discrete class of production-related values wherein the class matches the class of the optimal production-related value.

2. The method of claim 1 wherein the optimal production-related value is the production-related value that maximizes the score for the current state.

3. The method of claim 1 wherein the method is used to generate a separate score for each class of production-related values in a plurality of classes.

4. The method of claim 1 wherein the production-related value is further based on the length of time between the current time in the current state and the end of the preceding state.

5. A computer-readable medium having computer-executable instructions for performing steps comprising:
   selecting an optimal hidden dynamic value from a set of continuous hidden dynamic values;
   using the optimal hidden dynamic value to determine a probability for a current phone;
   using the optimal hidden dynamic value to select a path score from a set of path scores, each path score associated with a different discrete class of hidden dynamic values, and the selected path score being associated with the class of the optimal hidden dynamic value; and
   combining the selected path score and the probability for the current phone to form a path score for a path that includes the current phone.

6. The computer-readable medium of claim 5 wherein selecting an optimal hidden dynamic value comprises selecting a hidden dynamic value that maximizes the path score for the path that includes the current phone.

* * * * *